United States Patent
Hill

(10) Patent No.: US 7,930,199 B1
(45) Date of Patent: Apr. 19, 2011

(54) METHOD AND REPORT ASSESSING CONSUMER REACTION TO A STIMULUS BY MATCHING EYE POSITION WITH FACIAL CODING

(75) Inventor: Daniel A. Hill, St. Paul, MN (US)

(73) Assignee: Sensory Logic, Inc., Minneapolis, MN (US)

( * ) Notice: Subject to any disclaimer, the term of this patent is extended or adjusted under 35 U.S.C. 154(b) by 1129 days.

(21) Appl. No.: 11/491,535

(22) Filed: Jul. 21, 2006

(51) Int. Cl.
G06F 17/30 (2006.01)
(52) U.S. Cl. ..................... 705/7.29; 382/118
(58) Field of Classification Search ............... 705/7, 10; 355/35; 382/117, 118
See application file for complete search history.

(56) References Cited

U.S. PATENT DOCUMENTS

| | | | |
|---|---|---|---|
| 3,034,500 A | 5/1962 | Backster, Jr. |
| 3,548,806 A | 12/1970 | Fisher |
| 3,870,034 A | 3/1975 | James |
| 4,448,203 A | 5/1984 | Williamson et al. |
| 4,627,818 A | 12/1986 | Von Fellenberg |
| 4,794,533 A | 12/1988 | Cohen |
| 4,807,642 A | 2/1989 | Brown |
| 4,817,628 A | 4/1989 | Zealear et al. |
| 4,859,050 A | 8/1989 | Borah et al. |
| 4,964,411 A | 10/1990 | Johnson et al. |
| 4,975,960 A | 12/1990 | Petajan |
| 5,031,228 A | 7/1991 | Lu |
| 5,084,819 A | 1/1992 | Dewey et al. |
| 5,092,343 A | 3/1992 | Spitzer et al. |
| 5,124,911 A | 6/1992 | Sack |
| 5,148,477 A | 9/1992 | Neely et al. |
| 5,219,322 A | 6/1993 | Weathers |
| 5,247,938 A | 9/1993 | Silverstein et al. |
| 5,436,830 A | 7/1995 | Zaltman |
| 5,607,186 A | 3/1997 | Schroeder et al. |
| 5,663,900 A | 9/1997 | Bhandari et al. |
| 5,676,138 A | 10/1997 | Zawilinski |
| 5,725,472 A | 3/1998 | Weathers |
| 5,741,217 A | 4/1998 | Gero |
| 5,772,591 A | 6/1998 | Cram |
| 5,774,357 A | 6/1998 | Hoffberg et al. |
| 5,774,591 A | 6/1998 | Black et al. |
| 5,802,208 A | 9/1998 | Podilchuk et al. |
| 5,802,220 A | 9/1998 | Black et al. |

(Continued)

FOREIGN PATENT DOCUMENTS
JP 08115367 A 5/1996
(Continued)

OTHER PUBLICATIONS

Hazlett, Richard L; Hazlett, Sasha Yassky; "Emotional Response to Television Commercials: Facial EMG vs. Self-Report. (statistical data included)", Mar. 1999, Journal of Advertising Research, v39, n2, p. 7, Dialog 07379551 60072159.*

(Continued)

*Primary Examiner* — Beth V Boswell
*Assistant Examiner* — Stephanie Zagarella
(74) *Attorney, Agent, or Firm* — Dorsey & Whitney LLP

(57) ABSTRACT

A method of reporting consumer reaction to a stimulus and resultant report generated by (i) recording facial expressions and eye positions of a human subject while exposed to a stimulus throughout a time period, (ii) coding recorded facial expressions to emotions, and (iii) reporting recorded eye positions and coded emotions, along with an identification of the stimulus.

18 Claims, 8 Drawing Sheets

U.S. PATENT DOCUMENTS

| | | | |
|---|---|---|---|
| 5,871,211 | A | 2/1999 | Was |
| 5,875,108 | A | 2/1999 | Hoffberg et al. |
| 6,004,312 | A | 12/1999 | Finneran et al. |
| 6,008,817 | A | 12/1999 | Gilmore, Jr. |
| 6,009,210 | A | 12/1999 | Kang |
| 6,026,321 | A | 2/2000 | Miyata et al. |
| 6,026,322 | A | 2/2000 | Korenman et al. |
| 6,088,040 | A | 7/2000 | Oda et al. |
| 6,099,319 | A | 8/2000 | Zaltman et al. |
| 6,185,534 | B1 | 2/2001 | Breese et al. |
| 6,309,342 | B1 | 10/2001 | Blazey et al. |
| 6,311,190 | B1 | 10/2001 | Bayer et al. |
| 6,422,999 | B1 | 7/2002 | Hill |
| 6,443,840 | B2 | 9/2002 | Von Kohorn |
| 6,453,194 | B1 | 9/2002 | Hill |
| 6,533,583 | B1 | 3/2003 | Sportelli |
| 6,879,709 | B2 | 4/2005 | Tian et al. |
| 7,003,139 | B2 | 2/2006 | Endrikhovski et al. |
| 7,113,916 | B1 | 9/2006 | Hill |
| 7,120,880 | B1 * | 10/2006 | Dryer et al. ............... 715/863 |
| 7,233,684 | B2 * | 6/2007 | Fedorovskaya et al. ...... 382/118 |
| 7,246,081 | B2 | 7/2007 | Hill |
| 2002/0108125 | A1 | 8/2002 | Joao |
| 2003/0133599 | A1 * | 7/2003 | Tian et al. ............... 382/118 |
| 2003/0156304 | A1 | 8/2003 | Fedorovskaya et al. |
| 2003/0165269 | A1 | 9/2003 | Fedorovskaya et al. |
| 2003/0165270 | A1 | 9/2003 | Endrikhovski et al. |
| 2004/0101212 | A1 | 5/2004 | Fedorovskaya et al. |
| 2007/0066916 | A1 * | 3/2007 | Lemos .................. 600/558 |

FOREIGN PATENT DOCUMENTS

| | | |
|---|---|---|
| WO | WO 02/087443 A1 | 11/2002 |
| WO | WO 2004/091371 A2 | 10/2004 |

OTHER PUBLICATIONS

Ekman, Paul; Huang, Thomas S; Sejnowski, Terrence J; Hager, Joseph C; "Final Report to NSF of the Planning Workshop on Facial Expression", pp. 1-87, http://mambo.usc.edu/psl/nsf.txt.*

U.S. Appl. No. 60/717,268 Lemos, Jakob de. Provisional Application of 2007/0066916 A1. System and Method for Determining Human Emotion by Analyzing Eye Properties, Sep. 16, 2005.*

Ekman,P. & Friesen,W.V., Unmasking The Face, A Guide to Recognizing Emotions from Facial Clues, 1979.

Ekman,P., "Facial Clues to Deceit," Telling Lies, Clues to Deceit in the Marketplace, Politics, and Marriage, p. 123-161, 1992.

Ekman,P. et al., "Measuring Facial Movement," Environmental Psychology and Nonverbal Behavior, vol. 1, No. 1, p. 56-75, 1976.

Ekman,P., Friesen,W.V., & Ancoli, S., "Facial Signs of Emotional Experience," Journal of Personality and Social Psychology, vol. 39, No. 6, p. 1125-1134, 1980.

http:/dataface.nirc.com/Expression/FACS/body_facs.html, Facial Affect Coding System, Jul. 9, 2001.

1: Introduction to Facial Measurement, undated.

Sejnowsky, T., Computational Neurobiology, http://www.salk.edu/faculty/sejnowski.html, Jul. 9, 2001, Table 11-1 Emotion Predictions, p. 138-139, undated.

Gallup & Rpbinson, Impact, "CERA—A new System for Measuring Emotions in Advertising," 9:1, Winter 2000, pp. 1-2.

Table 11-1 Emotion Predictions.

Ekman, Paul & Friesen, Wallace; "Manual for the Facial Action Coding System"; 1978; 366 pages; Human Interaction Laboratory Departament of Psychiaty, University of California.

Ekman, P,Haung,T.S., Sejnowski,T.J., Hager, J.C. Workshop on Facial Expresion Understanding, 1992.

Bartlett, M.S., et al., "Measuring facial expressions by computer image analysis", Psychophysicology, 36 (1999), p. 253-263. Cambridge University Press.

Bassili, JN., "Emotion recognition: the role of facial movement and the relative importance of upper and lower areas of the face", Journal of Personality and Social Psychology 1979, vol. 37, No. 11, p. 2049, 2055.

Buam, K., et al., "Perception of Emotions: Measuring decoding accuracy of adult prosodic cues varying intensity", Summer 1998, Journal of Nonverbal Behavior, p. 89-108.

Chen, Qimei, et al., "Attitude toward the Site", Sep. 1999, Journal of Advertising Research, p. 27.

Cohn, J., et al., "A Comparative Study of Alternative FACS Coding Algorithms", tech. report CMU-RI-TR-02-06, Robotics Institute, Carnegie Mellon University, Nov. 2001.

Derbaix, C., "The Impact of Affective Reactions on Attitudes toward the Advertisement and the Brand: A Step toward Ecological Validity", Journal of Marketing Research, vol. 32, No. 4 (Nov. 1995), pp. 470-479.

Essa, I., et al., "Facial Expression Recognition using a Dynamic Model and Motion Energy" M.I.T. Media Laboratory Perceptual Computing Section Technical Report No. 307, Jun. 20-23, 1995, p. 1-8.

Frabotta, David, "Changing Focus", Feb. 21, 2000, Hotel & Motel Management, p. 1, 68.

Gordon-Murnane, Laura "Evaluating Net Evaluators", Feb. 1999, Searcher 7, 2, 57(1).

Hazlett, R., et al. "Emotional Response to Television Commercials: Facial EMG vs. Self-Report", Mar. 1999, Journal of Advertising Research, p. 7-23.

Izard, C., et al., "A System for Identifying Affect Expressions by Holistic Judgments (AFFEX)", Instructional Resources Center, University of Delaware, Newark, Delaware (1983).

Izard, C.E., "The Maximally Discriminative Facial Movement Cody System, (Rev. ed.)", Instructional Resources Center, University of Delaware, Newark, Delaware (1983).

Lee, C., et al., "Measuring Influence of the family decision making process using an observational method", 1998 Qualitative Market Research, p. 88-98.

Lien. J., et al., "A Multi-Method Approach for Discriminating Between Similar Facial Expressions, Including Expression Intensity Estimation", Proceedings of the IEEE Conference on Computer Vision and Pattern Recognition (CVPR '98), Jun. 1998.

Lien. J., et al., "Detection, Tracking, and Classification of Action Units in Facial Expression", Journal of Robotics and Autonomous Systems, Jul. 1999, p. 1-39.

Marcolin, et al., "Assessing User Competence: Conceptualization and Measurement", Information Systems Research. Linthicum: Mar. 2000, vol. 11, Issue 1, p. 37-60.

Tian, et al., "Recognizing action units for facial expression analysis", IEEE Transactions on Pattern Analysis and Machine Intelligence, vol. 23, No. 2, Feb. 2001, p. 97-115.

Hill, Daniel A.; "Facial Coding Analysis—Chapter 10"; Sensory Logic, Inc., 2002, pp. 151-179.

* cited by examiner

US 7,930,199 B1

METHOD AND REPORT ASSESSING CONSUMER REACTION TO A STIMULUS BY MATCHING EYE POSITION WITH FACIAL CODING

FIELD OF THE INVENTION

The invention relates to methods of measuring consumer reaction to business stimuli.

BACKGROUND

Assessing Consumer Reaction

Two key terms of importance to companies, their agencies, and marketing researchers in evaluating the effectiveness of advertising and other promotional materials are awareness and consideration. Awareness concerns the ability to ascertain whether consumers have noticed a stimulus, typically in terms of being able to recall it later by memory. Meanwhile, consideration concerns the ability to move the consumer to a point of engaging with the stimulus in hopes of promoting a sales opportunity. To date, however, both methods of evaluation have customarily been based on asking consumers to verbally recount whether they remember being exposed to a stimulus and whether their attitude toward the offer has become more positive. Inherent in this approach is the limitation that people may provide a knowingly false assessment to appease the interviewer or else may not readily know or be able to verbalize their response. Furthermore, in the case of awareness asking a consumer whether they recall a stimulus does not provide actionable insight as to how precisely they processed the stimulus.

Eye Tracking

The phenomenon of visual attention has been studied for over a century, but it is within the last few decades that advancements in eye tracking technology have made eye tracking feasible for business applications. Comprehensive eye tracking involves both the "what" and "where" of visual attention, which means the gauging of what specific details within a pictorial object get noticed by consumers and for what duration, and where in terms of the path the eye takes in sequentially noticing specific regions of interest within the pictorial object.

Means of tracking eye movements to assess awareness have been practiced by companies using stationary models to test consumers' gaze patterns. But despite the ability to learn where the subjects are looking on a real-time, behavioral, and in effect largely subconscious basis, those practitioners of eye tracking have been unable to report back to their clients how the test subjects are responding to the specific objects of their attention other than through conscious, cognitive, verbalized and generally after-the-fact summations.

Accordingly, a need exists for an improved method of marrying the unique capabilities of eye tracking with a means of assessing consideration.

SUMMARY OF THE INVENTION

A first aspect of the invention is a method of reporting consumer reaction to a stimulus. A second aspect of the invention is a report on consumer reaction to a stimulus.

A first embodiment of the first aspect of the invention includes the steps of (i) recording facial expressions and eye positions of a human subject while exposed to a stimulus throughout a time period, (ii) coding recorded facial expressions to emotions, and (iii) reporting recorded eye positions and coded emotions, along with an identification of the stimulus.

A second embodiment of the first aspect of the invention includes the steps of (i) recording facial expressions and eye positions of a human subject while exposed to a stimulus throughout a time period, (ii) coding and translating recorded facial expressions to at least one of an impact score and an appeal score, and (iii) reporting recorded eye positions and at least one of a coded impact score and a coded appeal score, along with an identification of the stimulus.

A third embodiment of the first aspect of the invention includes the steps of (i) recording facial expressions and eye positions of a plurality of human subjects while each is exposed to a stimulus throughout a time period, (ii) ascertaining the number of human subjects who exhibited at least one recorded facial expression capable of being coded to an emotion while exposed to the stimulus, and (iii) reporting recorded eye positions and information from which can be ascertained the percentage of human subjects who exhibited at least one recorded facial expression capable of being coded, along with an identification of the stimulus to which the subject was exposed.

A fourth embodiment of the first aspect of the invention includes the steps of (i) recording facial expressions at least when the eye position of a human subject exposed to a stimulus is fixed upon a given attribute of the stimulus, (ii) coding recorded facial expressions to emotions when the eye position is fixed upon the given attribute of the stimulus, and (iii) reporting coded emotions along with an identification of the stimulus to which the subject was exposed and an identification of the given attribute of the stimulus.

A fifth embodiment of the first aspect of the invention includes the steps of (i) recording facial expressions at least when the eye position of a human subject exposed to a stimulus is fixed upon a given attribute of the stimulus, (ii) coding and translating recorded facial expressions to at least one of an impact score and an appeal score when the eye position is fixed upon the given attribute of the stimulus, and (iii) reporting at least one of the coded impact score and the coded appeal score, along with an identification of the stimulus to which the subject was exposed and an identification of the given attribute of the stimulus.

A sixth embodiment of the first aspect of the invention includes the steps of (i) recording facial expressions at least when the eye position of a human subject exposed to a stimulus is fixed upon a given attribute of the stimulus, (ii) ascertaining the number of human subjects exposed to the stimulus who exhibited at least one recorded facial expression capable of being coded to an emotion when the eye position was fixed upon the given attribute of the stimulus, and (iii) reporting information from which can be ascertained the percentage of human subjects who exhibited at least one recorded facial expression capable of being coded when the eye position was fixed upon the given attribute of the stimulus, along with an identification of the stimulus to which the subject was exposed and an identification of the given attribute of the stimulus.

A first embodiment of the second aspect of the invention includes (i) a visual indication of the eye positions of a human subject while exposed to a stimulus during a time period, (ii) a list of at least one emotion coded from facial expressions exhibited by the subject while exposed to the stimulus, and (iii) an identification of the stimulus to which the subject was exposed.

A second embodiment of the second aspect of the invention includes (i) a visual indication of the eye positions of a human subject while exposed to a stimulus during a time period, (ii) at least one of an impact score and an appeal score, coded and translated from facial expressions exhibited by the subject while exposed to the stimulus, and (iii) an identification of the stimulus to which the subject was exposed.

A third embodiment of the second aspect of the invention includes (i) a visual indication of the eye positions of a human subject while exposed to a stimulus, (ii) information from which can be ascertained the percentage of human subjects who exhibited at least one recorded facial expression capable of being coded while exposed to the stimulus, and (iii) an identification of the stimulus to which the subject was exposed.

A fourth embodiment of the second aspect of the invention includes (i) a visual indication of a stimulus to which a human subject was exposed, (ii) an identification of a given attribute of the stimulus, and (iii) a list of at least one emotion coded from facial expressions exhibited by the subject when the eye position is fixed upon the given attribute of the stimulus.

A fifth embodiment of the second aspect of the invention includes (i) a visual indication of a stimulus to which a human subject was exposed, (ii) an identification of a given attribute of the stimulus, and (iii) at least one of an impact score and an appeal score coded and translated from facial expressions exhibited by the subject when the eye position of the subject is fixed upon the given attribute of the stimulus.

A sixth embodiment of the second aspect of the invention includes (i) a visual indication of a stimulus to which a human subject was exposed, (b) an identification of a given attribute of the stimulus, and (c) information from which can be ascertained the percentage of human subjects who exhibited at least one recorded facial expression capable of being coded when the eye position was fixed upon the given attribute of the stimulus.

OUTLINE OF THE INVENTION

A method of reporting consumer reaction to a stimulus, comprising: (a) recording facial expressions and eye positions of a human subject while exposed to a stimulus throughout a time period, (b) coding and translating recorded facial expressions to at least one of an impact score and an appeal score, and (c) reporting recorded eye positions and at least one of a coded impact score and a coded appeal score, along with an identification of the stimulus.

The method of reporting consumer reaction to a stimulus wherein recorded facial expressions are coded and translated to both an impact score and an appeal score, and both the impact score and the appeal score are reported.

The method of reporting consumer reaction to a stimulus further comprising (i) repeating steps (a) through (c) for a plurality of human subjects with the same stimulus, and (ii) reporting information from which can be ascertained the percentage of human subjects who exhibited at least one recorded facial expression capable of being coded.

The method of reporting consumer reaction to a stimulus further comprising (i) coding recorded facial expressions to emotions, and (ii) reporting the coded emotions along with the recorded eye positions.

The method of reporting consumer reaction to a stimulus wherein an eye position is detected and recorded when the eyes of the subject remain fixed on a location for at least about 50 milliseconds.

The method of reporting consumer reaction to a stimulus wherein exposure to the stimulus lasts for a time period of about 1 to 10 seconds.

The method of reporting consumer reaction to a stimulus wherein facial expressions are coded by a facial coding technique.

The method of reporting consumer reaction to a stimulus wherein the facial coding technique is based upon FACS.

The method of reporting consumer reaction to a stimulus wherein reporting recorded eye positions comprises superimposing a visual indication of the location of the recorded eye positions upon a depiction of the stimulus.

The method of reporting consumer reaction to a stimulus wherein reporting recorded eye positions comprises superimposing a visual indication of the density of recorded eye positions upon a depiction of the stimulus.

A report on consumer reaction to a stimulus, comprising: (a) a visual indication of the eye positions of a human subject while exposed to a stimulus during a time period, (b) at least one of an impact score and an appeal score, coded and translated from facial expressions exhibited by the subject while exposed to the stimulus, and (c) an identification of the stimulus to which the subject was exposed.

The report of consumer reaction to a stimulus wherein the report includes both an impact score and an appeal score coded and translated from facial expressions exhibited by the subject while exposed to the stimulus.

The report of consumer reaction to a stimulus further comprising information from which can be ascertained the percentage of human subjects who exhibited at least one facial expression capable of being coded to an emotion while exposed to the stimulus.

The report of consumer reaction to a stimulus wherein a plurality of reports are provided for a plurality of consecutive time periods.

The report of consumer reaction to a stimulus wherein the stimulus is a business stimulus.

The report of consumer reaction to a stimulus wherein eye positions are visually indicated when the eyes of the subject remain fixed on a location for at least about 50 milliseconds.

The report of consumer reaction to a stimulus wherein the subject was exposed to the stimulus for a period of about 1 to 10 seconds.

The report of consumer reaction to a stimulus wherein the impact score and/or appeal score are coded from facial expressions by a facial coding technique.

The report of consumer reaction to a stimulus wherein the facial coding technique is based upon FACS.

The report of consumer reaction to a stimulus wherein the location of the eye positions are superimposed upon a depiction of the stimulus.

The report of consumer reaction to a stimulus wherein the location of the eye positions are reported as a density of eye positions superimposed upon a depiction of the stimulus.

A method of reporting consumer reaction to a stimulus, comprising: (a) recording facial expressions and eye positions of a plurality of human subjects while each is exposed to a stimulus throughout a time period, (b) ascertaining the number of human subjects who exhibited at least one recorded facial expression capable of being coded to an emotion while exposed to the stimulus, and (c) reporting recorded eye positions and information from which can be ascertained the percentage of human subjects who exhibited at least one recorded facial expression capable of being coded, along with an identification of the stimulus to which the subject was exposed.

The method of reporting consumer reaction to a stimulus wherein steps (a) through (c) are repeated for a plurality of consecutive time periods.

The method of reporting consumer reaction to a stimulus wherein recording facial expressions involves video recording the human subject.

The method of reporting consumer reaction to a stimulus wherein an eye position is detected and recorded when the eyes of the subject remain fixed on a location for at least about 50 milliseconds.

The method of reporting consumer reaction to a stimulus wherein exposure to the stimulus lasts for a time period of about 1 to 10 seconds.

The method of reporting consumer reaction to a stimulus wherein facial expressions are coded by a facial coding technique.

The method of reporting consumer reaction to a stimulus wherein the facial coding technique is based upon FACS.

The method of reporting consumer reaction to a stimulus wherein reporting recorded eye positions comprises superimposing a visual indication of the location of the recorded eye positions upon a depiction of the stimulus.

The method of reporting consumer reaction to a stimulus wherein reporting recorded eye positions comprises superimposing a visual indication of the density of recorded eye positions upon a depiction of the stimulus.

A report on consumer reaction to a stimulus, comprising: (a) a visual indication of the eye positions of a human subject while exposed to a stimulus, (b) information from which can be ascertained the percentage of human subjects who exhibited at least one recorded facial expression capable of being coded while exposed to the stimulus, and (c) an identification of the stimulus to which the subject was exposed.

The report of consumer reaction to a stimulus wherein a plurality of reports are provided for a plurality of consecutive time periods.

The report of consumer reaction to a stimulus wherein the stimulus is a business stimulus.

The report of consumer reaction to a stimulus wherein eye positions are visually indicated when the eyes of the subject remain fixed on a location for at least about 50 milliseconds.

The report of consumer reaction to a stimulus wherein each subject is exposed to the stimulus for a period of about 1 to 10 seconds.

The report of consumer reaction to a stimulus wherein the facial expressions are coded to emotions by a facial coding technique.

The report of consumer reaction to a stimulus wherein the facial coding technique is based upon FACS.

The report of consumer reaction to a stimulus wherein the location of the eye positions are superimposed upon a depiction of the stimulus.

The report of consumer reaction to a stimulus wherein the location of the eye positions are reported as a density of eye positions superimposed upon a depiction of the stimulus.

A method of reporting consumer reaction to an attribute of a stimulus, comprising: (a) recording facial expressions at least when the eye position of a human subject exposed to a stimulus is fixed upon a given attribute of the stimulus, (b) coding recorded facial expressions to emotions when the eye position is fixed upon the given attribute of the stimulus, and (c) reporting coded emotions along with an identification of the stimulus to which the subject was exposed and an identification of the given attribute of the stimulus.

The method of reporting consumer reaction to an attribute of a stimulus further comprising (i) repeating steps (a) through (c) for a number of human subjects with the same stimulus, and (ii) reporting information from which can be ascertained the percentage of human subjects who exhibited at least one recorded facial expression capable of being coded when the eye position is fixed upon the given attribute of the stimulus.

The method of reporting consumer reaction to an attribute of a stimulus wherein steps (a) through (c) are performed for a plurality of different attributes of the same stimulus.

The method of reporting consumer reaction to an attribute of a stimulus wherein an eye position is detected and recorded when the eyes of the subject remain fixed on a location for at least about 50 milliseconds.

The method of reporting consumer reaction to an attribute of a stimulus wherein facial expressions are coded by a facial coding technique.

The method of paragraph reporting consumer reaction to an attribute of a stimulus wherein the facial coding technique is based upon FACS.

The method of reporting consumer reaction to an attribute of a stimulus wherein reporting coded emotions comprises reporting a tally of coded emotions as a percentage of each coded emotion relative to all coded emotions.

The method of reporting consumer reaction to an attribute of a stimulus wherein (i) coding recorded facial expressions to emotions comprises coding recorded facial expressions to positive and negative emotions, and (ii) reporting coded emotions comprises reporting at least one of (–) the percentage of all coded emotions comprising positive emotions, (–) the percentage of all coded emotions comprising negative emotions, and (–) an average of the positive and negative coded emotions.

A report on consumer reaction to an attribute of a stimulus, comprising: (a) a visual indication of a stimulus to which a human subject was exposed, (b) an identification of a given attribute of the stimulus, and (c) a list of at least one emotion coded from facial expressions exhibited by the subject when the eye position is fixed upon the given attribute of the stimulus.

The report of consumer reaction to an attribute of a stimulus further comprising information from which can be ascertained the percentage of human subjects who exhibited at least one facial expression capable of being coded to an emotion when the eye position was fixed upon the given attribute of the stimulus.

The report of consumer reaction to an attribute of a stimulus wherein a plurality of reports are provided for a plurality of consecutive time periods.

The report of consumer reaction to an attribute of a stimulus wherein the stimulus is a business stimulus.

The report of consumer reaction to an attribute of a stimulus wherein eye positions are visually indicated when the eyes of the subject remain fixed on a location for at least about 50 milliseconds.

The report of consumer reaction to an attribute of a stimulus wherein the subject was exposed to the stimulus for a period of about 1 to 10 seconds.

The report of consumer reaction to an attribute of a stimulus wherein the list of at least one emotion is coded from facial expressions by a facial coding technique.

The report of consumer reaction to an attribute of a stimulus wherein the facial coding technique is based upon FACS.

The report of consumer reaction to an attribute of a stimulus wherein the list of at least one emotion includes a tally of emotions coded from facial expressions exhibited by the subject when the eye position is fixed upon the given attribute of the stimulus, reported as a percentage of each emotion relative to all emotions.

The report of consumer reaction to an attribute of a stimulus wherein the list of at least one emotion comprises a listing of emotions grouped as positive and negative emotions.

A method of reporting consumer reaction to an attribute of a stimulus, comprising: (a) recording facial expressions at least when the eye position of a human subject exposed to a stimulus is fixed upon a given attribute of the stimulus, (b) coding and translating recorded facial expressions to at least one of an impact score and an appeal score when the eye position is fixed upon the given attribute of the stimulus, and (c) reporting at least one of the coded impact score and the coded appeal score, along with an identification of the stimulus to which the subject was exposed and an identification of the given attribute of the stimulus.

The method of reporting consumer reaction to an attribute of a stimulus wherein recorded facial expressions are coded and translated to both an impact score and an appeal score and both the impact score and the appeal score are reported.

The method of reporting consumer reaction to an attribute of a stimulus further comprising (i) repeating steps (a) through (c) for a plurality of human subjects with the same stimulus, and (ii) reporting information from which can be ascertained the percentage of human subjects who exhibited at least one recorded facial expression capable of being coded and translated when the eye position is fixed upon the given attribute of the stimulus.

The method of reporting consumer reaction to an attribute of a stimulus further comprising (i) coding recorded facial expressions to emotions, and (ii) reporting the coded emotions along with the recorded eye positions.

The method of reporting consumer reaction to an attribute of a stimulus wherein steps (a) through (c) are performed for a plurality of different attributes of the same stimulus.

The method of reporting consumer reaction to an attribute of a stimulus wherein an eye position is detected and recorded when the eyes of the subject remain fixed on a location for at least about 50 milliseconds.

The method of reporting consumer reaction to an attribute of a stimulus wherein exposure to the stimulus lasts for a time period of about 1 to 10 seconds.

The method of reporting consumer reaction to an attribute of a stimulus wherein facial expressions are coded by a facial coding technique.

The method of reporting consumer reaction to an attribute of a stimulus wherein the facial coding technique is based upon FACS.

A report on consumer reaction to an attribute of a stimulus, comprising: (a) a visual indication of a stimulus to which a human subject was exposed, (b) an identification of a given attribute of the stimulus, and (c) at least one of an impact score and an appeal score coded and translated from facial expressions exhibited by the subject when the eye position of the subject is fixed upon the given attribute of the stimulus.

The report of consumer reaction to an attribute of a stimulus wherein the report includes both an impact score and an appeal score coded and translated from facial expressions exhibited by the subject when the eye position of the subject was fixed upon the given attribute of the stimulus.

The report of consumer reaction to an attribute of a stimulus further comprising information from which can be ascertained the percentage of human subjects who exhibited at least one facial expression capable of being coded to an emotion when the eye position was fixed upon the given attribute of the stimulus.

The report of consumer reaction to an attribute of a stimulus wherein a plurality of reports are provided for a plurality of consecutive time periods.

The report of consumer reaction to an attribute of a stimulus wherein the stimulus is a business stimulus.

The report of consumer reaction to an attribute of a stimulus wherein eye positions are visually indicated when the eyes of the subject remain fixed on a location for at least about 50 milliseconds.

The report of consumer reaction to an attribute of a stimulus wherein the defined period is a period of about 1 to 10 seconds.

The report of consumer reaction to an attribute of a stimulus wherein the impact and/or appeal scores are coded from facial expressions by a facial coding technique.

The report of consumer reaction to an attribute of a stimulus wherein the facial coding technique is based upon FACS.

A method of reporting consumer reaction to an attribute of a stimulus, comprising: (a) recording facial expressions at least when the eye position of a human subject exposed to a stimulus is fixed upon a given attribute of the stimulus, (b) ascertaining the number of human subjects exposed to the stimulus who exhibited at least one recorded facial expression capable of being coded to an emotion when the eye position was fixed upon the given attribute of the stimulus, and (c) reporting information from which can be ascertained the percentage of human subjects who exhibited at least one recorded facial expression capable of being coded when the eye position was fixed upon the given attribute of the stimulus, along with an identification of the stimulus to which the subject was exposed and an identification of the given attribute of the stimulus.

The method of reporting consumer reaction to an attribute of a stimulus wherein recording facial expressions involves video recording the human subject.

The method of reporting consumer reaction to an attribute of a stimulus wherein an eye position is detected and recorded when the eyes of the subject remain fixed on a location for at least about 50 milliseconds.

The method of reporting consumer reaction to an attribute of a stimulus wherein exposure to the stimulus lasts for a time period of about 1 to 10 seconds.

The method of reporting consumer reaction to an attribute of a stimulus wherein facial expressions are coded by a facial coding technique.

The method of reporting consumer reaction to an attribute of a stimulus wherein the facial coding technique is based upon FACS.

A report on consumer reaction to an attribute of a stimulus, comprising: (a) a visual indication of a stimulus to which a human subject was exposed, (b) an identification of a given attribute of the stimulus, and (c) information from which can be ascertained the percentage of human subjects who exhibited at least one recorded facial expression capable of being coded when the eye position was fixed upon the given attribute of the stimulus.

The report of consumer reaction to an attribute of a stimulus wherein the stimulus is a business stimulus.

The report of consumer reaction to an attribute of a stimulus wherein eye positions are visually indicated when the eyes of the subject remain fixed on a location for at least about 50 milliseconds.

The report of consumer reaction to an attribute of a stimulus wherein exposure to the stimulus lasted for a time period of about 1 to 10 seconds.

The report of consumer reaction to an attribute of a stimulus wherein facial expressions were coded by a facial coding technique.

The report of consumer reaction to an attribute of a stimulus wherein the facial coding technique is based upon FACS.

DETAILED DESCRIPTION OF THE INVENTION INCLUDING A BEST MODE

Definitions

Figure 1:
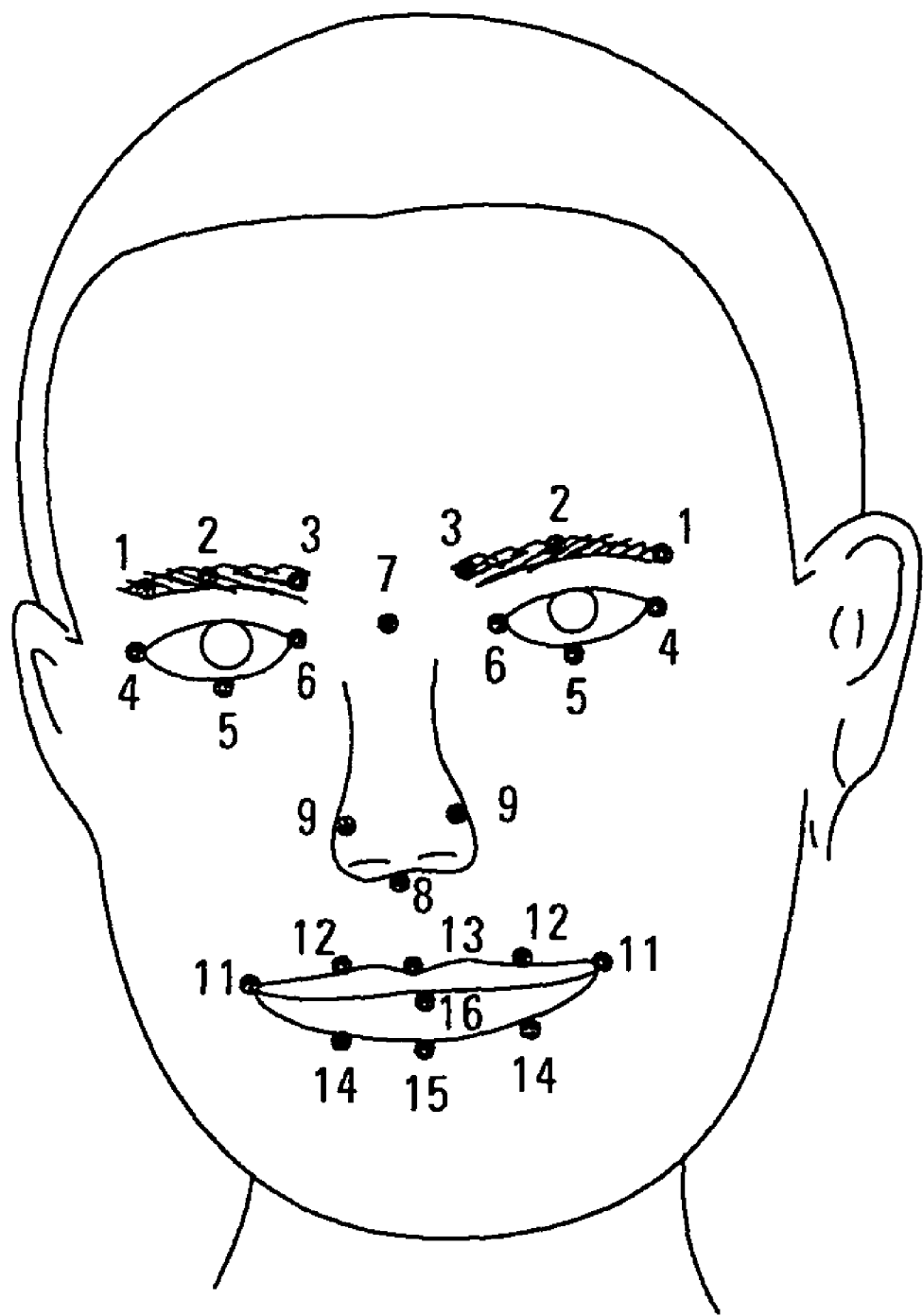
FIG. 1 is one embodiment of a set of facial features suitable for tracking by the FfT™ facial feature tracking software.

As utilized herein, including the claims, the phrase "business stimulus," means both company stimulus and marketing stimulus.

As utilized herein, including the claims, the phrase "company stimulus," refers to an item pertaining to the governance, organization, management, structure, policies, procedures, work-place environment, etc. of a company. Exemplary company stimuli include announcements to employees, reporting obligations of employees, physical location of management relative to employees reporting to management, lunch break policy, smoking ban policy, bonus pay policy and procedure, type of work-stations, etc.

As utilized herein, including the claims, the phrase "marketing stimulus," refers to an item selected and designed to (i) advertise, promote and/or enhance the sales or acceptance of a product and/or service, (ii) advertise, promote, improve and/or enhance customer recognition and/or the public image of a person and/or business, (iii) position a product, and/or (iv) enhance brand identity. Exemplary marketing stimuli include, television commercials, radio advertisements, print advertisements, billboard advertisements, point-of-purchase displays, live inquiry such as questions regarding pricing, questions regarding attitudes and questions regarding purchasing preferences, store-front signage, packaging, Yellow Pages advertisements, brochures, literature used in mass mailings, web sites, individual web pages, store layouts, interior design of a store, product appearance, product operation, presentation materials, computer generated virtual shopping experiences, etc.

As utilized herein, including the claims, the acronym "FACS," refers to the Facial Action Coding System originally described in Ekman, P., Friesen, W. V., *Facial Action Coding System: A Technique for the Measurement of Facial Movement*, Consulting Psychologists Press, Palo Alto, Calif. (1978).

Overview

The tracking of facial muscle activity provides a method for gauging consideration through the degree of emotional buy-in. This method is commonly known as facial coding, and it typically involves using either comprehensive facial measurements or selective facial measurements. Comprehensive facial measurements include open-ended observations of what is casually seen or direct measurements such as the Facial Action Coding System ("FACS") originally described in Ekman, P., Friesen, W. V., *Facial Action Coding System: A Technique for the Measurement of Facial Movement*, Consulting Psychologists Press, Palo Alto, Calif. (1978).

The invention provides a synchronized means of assessing the look and feel responses of consumers to business stimuli in order to aid companies and agencies as they seek to enhance the effectiveness of their advertising and general marketing efforts. The method involves (a) capturing what specifically the test participants are looking at when they visually inspect stimulus, typically a marketing stimulus, through the use of an eye tracking unit, (b) taking the recorded output and displaying it as a series of diagrams that indicate on an individual or collective basis where the subjects specifically looked, for how long, and the order in which they most commonly reviewed the pictorial object, (c) visually recording facial expressions of a human subject as the subject is exposed to the pictorial object so as to generate a chronological sequence of recorded facial images, (d) reviewing the videotape of the facial expressions in order to detect and record the expressions using the FACS system or a system based upon FACS; (e) coding contemporaneously detected and recorded expressional repositionings to at least one of an action unit, one or more emotions, or a combination of an appeal value and an impact value, and (f) reporting what the participants looked at and the contemporaneously coded data, along with an identification of the stimulus to which the subject was exposed.

The method can further include combining the eye tracking and facial coding results by providing a display of the eye tracking output in conjunction with the appeal and impact tallies, the percentage of positive and negative emotions, and/or the specific emotions felt by the test subjects in relation to the pictorial object, in general, as well as to specific elements within the object.

By synchronizing the real-time readings of both gaze and facial muscle activity, the opportunity exists for knowing on a truer scientific basis the relative effectiveness of various business stimuli in eliciting the desired responses.

The Method

Capturing Data

Generally, a subject is recruited for participation as a member of a sample population, sometimes after responding appropriately to several qualification questions (e.g., are they a member of the product target market). The portions of the interview session that will involve the simultaneously capturing of eye tracking data and videotape to be used for facial coding analysis purposes is facilitated by a video camera positioned atop the eye tracker unit. One possible embodiment of the method is to utilize a Tobii Model 1750 Eye Tracker available from Tobii Technology AB of Stockholm, Sweden. It comes equipped with five miniature cameras set into a monitor, above and below and computer screen on which the stimuli are presented. The stimuli will be shown on the eye tracker unit's screen, causing the participant to look slightly up and ahead, thus enabling the capture of high quality images of the participant's facial expressions through a video camera (i.e., a web camera) while the participants are looking at the business stimuli to be presented to them. Another option is to mount a camera on the table or desktop in front of the participant.

At the start of an interview session, the participant will take a seat in front of the eye tracking unit and go through a brief calibration phrases, where a series of red dots are shown on screen and the participant is asked to focus on each dot, in turn, to ensure that the machine is tracking their eye gaze accurately. Once that exercise is complete, the testing session can begin.

The participant is then exposed to the stimuli on the eye tracking unit screen (i.e., a business stimuli). The exposure is likely to be for a specific timed duration, with the stimuli either shown in a set order or in randomized fashion. During the exposure period, the camera will be on so as to record the participant's non-verbal, facial response to the stimulus the participants are experiencing. Questions or ratings may or may not occur between the exposure periods for the variety of stimuli to be shown as part of the testing session. Whatever the procedure, care should be taken to ensure that the procedure of presenting the stimuli does not distract or inhibit the participant's natural responses to the experience more so than necessary.

Upon completion of the session (i.e., exposure to the entire collection of stimuli) the videotape is shut off and the participant dismissed. Preferably, the session is repeated for about 10 to 200, preferably about 20 to 100 participants.

Data Generation

Eye tracking output is based on securing gaze fixations. For example, output from a Tobii Model 1750 Eye Tracker shows a blue dot for individual output anytime a person has observed a specific detail in the pictorial object for at least 50 milliseconds. That threshold is used because research indicates that a person needs a gaze of at least that duration to be able to process a visual element, whether that element consists of words (text), an image or some combination thereof. The blue dot will increase in size to the extent that the stabilized gaze duration exceeds the 50 millisecond threshold. A gaze duration that reaches that threshold is referred to as a fixation. A second output at the individual level consists of blue tracer lines that indicate saccades, or rapid eye scans that don't reach the 50 millisecond threshold. The tracer lines or saccades are useful in indicating the path or flow the eye is taking in assessing the pictorial object.

Once a plurality of individual subjects have been tested and their eye tracking data captured, "hot spot" map(s) can be generated that show where on the pictorial element the subjects collectively concentrated their gaze the most. Thus for example, a print ad may be coded with a dark red hot spot that indicates that a majority of the gaze durations, or fixations, were devoted to the key visual image dominating the middle of the screen. A green spot on the company's logo can indicate that a much less dense mass of gaze durations were devoted to the company sponsoring the ad. Stimuli which changes during the testing period (e.g., a TV spot) a hot spot map may be generated frame-by-frame or second-by-second throughout the testing period.

At the same time, consumer reaction to the stimulus is assessed utilizing facial coding (e.g., FACS), to obtain information about the emotional response to what the subjects are viewing. This assessment may be done manually or automated through the use of a computer, typically involving a series of viewing periods each as short as 1/30th of a second.

The review may involve a variety of approaches, including: (a) a computer that detects instances where there is sufficient facial muscle activity to suggest a codeable event, with a manual review and coding of the activity during such detected instances using the FACS system, (b) a fully computerized system in which the videotape of the session can be analyzed by software having facial feature tracking capabilities, whereby expressional repositioning of selected facial features by the participant in the videotape can be automatically detected and recorded, and (c) a manual review of the videotape, for the same purpose of assessing whether significant facial muscle activity occurs that can then be coded using the FACS system.

Software with facial feature tracking capabilities is commercially available from Neven Vision, Inc. of Santa Monica, Calif. under the designations FfT™ (facial feature tracking). A preferred set of facial features suitable for tracking by the FfT™ facial feature tracking software is described in Table Two below and depicted in FIG. 1. This preferred set of facial features allows the detection of facial feature movements (FFMs) suitable for coding to action units (AUs), Emotions, Emotional Values, and Appeal and Impact Values suitable for use in the present invention.

Facial Coding Analysis

TABLE TWO

FACIAL FEATURES

| FACIAL FEATURE NUMBER | LOCATION DESCRIPTION |
|---|---|
| FF1 | Outer Edge of Brow |
| FF2 | Middle of Brow |
| FF3 | Inner Edge of Brow |
| FF4 | Outer Edge of Eye |
| FF5 | Lower Edge of Eye |
| FF6 | Inside Edge of Eye |
| FF7 | Bridge of Nose |
| FF8 | Tip of Nose |
| FF9 | Lateral Sides of Nose |
| FF10 | Area Below Each Nostril |
| FF11 | Outside Edges of Mouth |
| FF12 | Left and Right Medial Points on Upper Lip |
| FF13 | Center of Upper Lip |
| FF14 | Left and Right Medial Points on Lower Lip |
| FF15 | Outside Edge at Center of Lower Lip |
| FF16 | Inside Edge at Center of Lower Lip |

The software can conduct a computerized comparison of the facial position of each of the selected facial features through sequential facial images and automatically code contemporaneously detected and recorded expressional repositionings to at least one of an AU, one or more Emotions and Emotional Values, or a combination of an Appeal Value and an Impact Value (A&I Values) in accordance with a coding and translation system, such as the specific coding system set forth below.

Optionally, but preferably, the software notes the location of any detected smile (i.e., facial expression involving upward and outward movement of one or both corners of mouth (nodes 11)) so that a trained individual can quickly locate occurrences of a smile on the videotape, manually view the smile, categorize the smile as a true smile (expansive smile that also may include crow's feet around the eyes and the relaxation of the muscle circling the eye such that the eye acquires the tell-tale glint or "twinkle" of joy), a robust social smile involving only the lower part of the face, a weak social smile also involving only the lower part of the face and not as uplifted as a robust social smile, or a micro-smile (on one side of the face only and more briefly), and input such categorization data into the computer system for use in coding. An optional smile category is skepticism (a social smile that is accompanied by a negative or sarcastic comment, such that the smile "masks" a negative response).

Detected and reported FFMs can be automatically coded to AUs by a computer in accordance with a predetermined code, such as that set forth in Table Three.

TABLE THREE

CODING OF FACIAL FEATURE MOVEMENT (FFM) TO AU

| ACTION UNIT | FACIAL FEATURE MOVEMENT | |
|---|---|---|
| | NUMBER | DIRECTION |
| AU1 | FF3 | Up |
| AU2 | FF1 | Up |
| AU4 | FF2 | Down |

TABLE THREE-continued

CODING OF FACIAL FEATURE MOVEMENT (FFM) TO AU

| ACTION UNIT | FACIAL FEATURE MOVEMENT NUMBER | DIRECTION |
|---|---|---|
| | and/or FF3 | In |
| AU5 | FF5 | Up or Down |
| AU6 | FF1 and/or FF5 | Down Together |
| AU7 | FF5 | Together |
| AU9 | FF9 or FF9 & FF12 | Up & Out Up/Up |
| AU10 | FF10 and/or FF12 | Wider Up |
| AU11 | FF10 | Wider |
| AU12U | FF11 (one) | Up & Out |
| AU12F | FF11 (both) | Up & Out |
| AU14 | FF11 and FF16 | Slight Out & Down Tighter |
| AU15 | F11 | Down |
| AU16 | FF14 and FF15 | Down Down |
| AU17 | FF13 and FF15 | Up Up |
| AU20 | FF10 and/or FF11 | Down & Out Down & Wider |
| AU22 | FF11 and FF16 | Closer Wider |
| AU23 | FF11 and FF16 | Closer Tighter |
| AU24 | FF16 | Tighter |
| AU26 | FF16 | Wider |
| AU27 | FF11 and FF16 | Closer Widest |

Translating

Coded AUs can be translated to Emotions and Emotional Values by a computer in accordance with a predetermined correlation system, such as that set forth in Table Four. Since AU12F can translate for more than one set of Emotions and Emotional Values, additional information is required. A true smile is identified as AU12T and translates as set forth in Table Four. A robust social smile is an AU12R and translates as set forth in Table Four. A weak social smile is an AU12W. A social smile accompanied by a negative or sarcastic comment is an AU12S and translates as set forth in Table Four. A unilateral micro smile is an AU12U and translates as set forth in Table Four. The additional information necessary to determine with a coded AU12F as an AU12T, AU12R, AU12W or an AU12S can be manually input into the computer by a trained individual after viewing that segment of the videotape corresponding to the coded AU12F and observing whether the AU12F is expansive and involving the eyes, full, less robust, or perhaps accompanied by a negative or sarcastic comment.

TABLE FOUR

CORRELATION OF AUS TO EMOTION(S)

| ACTION UNIT | EMOTION TYPE | WEIGHTED VALUE |
|---|---|---|
| AU1 | Fear | 0.50 |
| | Sadness | 0.25 |
| | Surprise | 0.25 |
| AU2 | Fear | 0.33 |
| | Surprise | 0.67 |
| AU4 | Anger | 0.34 |
| | Fear | 0.33 |
| | Sadness | 0.33 |
| AU5 | Anger | 0.34 |
| | Fear | 0.33 |
| | Surprise | 0.33 |
| AU6 | Sadness | 1.00 |
| AU6 + AU12 (AU12T) | True Smile | 1.00 |
| AU7 | Anger | 1.00 |
| AU9 | Disgust | 1.00 |
| AU10 | Anger | 0.33 |
| | Disgust | 0.67 |
| AU11 | Sadness | 1.00 |
| AU12U | Micro Smile | 1.00 |
| AU12R | Robust Social Smile | 1.00 |
| AU12W | Weak Social Smile | 1.00 |
| AU12S | Skepticism | 1.00 |
| AU14 | Disgust | 1.00 |
| AU15 | Disgust | 0.50 |
| | Sadness | 0.50 |
| AU16 | Disgust | 1.00 |
| AU17 | Anger | 0.34 |
| | Disgust | 0.33 |
| | Sadness | 0.33 |
| AU20 | Fear | 1.00 |
| AU22 | Anger | 1.00 |
| AU23 | Anger | 1.00 |
| AU24 | Anger | 1.00 |
| AU25 | Disgust | 0.25 |
| | Sadness | 0.25 |
| | Anger | 0.25 |
| | Fear | 0.25 |
| AU26 | Anger | 0.20 |
| | Fear | 0.20 |
| | Disgust | 0.20 |
| | Sadness | 0.20 |
| | Surprise | 0.20 |
| AU27 | Fear | 0.50 |
| | Surprise | 0.50 |

Alternatively, the computer can be programmed to bypass the step of coding FFMs to AUs and simply code the FFMs directly to Emotions and Emotional Values when this correlation is known.

Translated Emotions and Emotional Values may be further translated into A&I Values by a computer in accordance with a predetermined correlation system, such as that set forth in Table Five.

TABLE FIVE

CORRELATION OF EMOTION(S) TO A&M VALUES

| | A&I COEFFICIENTS | |
|---|---|---|
| EMOTION | IMPACT | APPEAL |
| AU1 | 0.2 to 0.6 | 0 to −0.5 |
| AU2 | 0.2 to 0.6 | 0 to −0.5 |
| AU4 | 1.5 to 2.0 | −1.0 to −1.5 |
| AU5 | 1.0 to 1.5 | 0 to −0.5 |

TABLE FIVE-continued

CORRELATION OF EMOTION(S) TO A&M VALUES

| | A&I COEFFICIENTS | |
| --- | --- | --- |
| EMOTION | IMPACT | APPEAL |
| AU7 | 1.0 to 1.5 | −0.5 to −1.0 |
| AU9 | 0 to −0.5 | 0 to 0.5 |
| AU10 | 0 to 0.5 | 0.5 to 1.0 |
| AU11 | 0.5 to 1.0 | 0 to 0.5 |
| AU12T | 0.5 to 1.0 | 0 to 0.5 |
| AU12R | 0.5 to 1.0 | 0 to 0.5 |
| AU12W | 1.5 to 2.0 | 1.0 to 1.5 |
| AU12M | 0.5 to 1.0 | 0.2 to 0.6 |
| AU12S | 2.0 to 2.5 | −0.5 to −1.0 |
| AU14 | 1.0 to 1.5 | −1.0 to −1.5 |
| AU15 | 1.0 to 1.5 | −0.5 to −1.0 |
| AU16 | 1.5 to 2.0 | −0.5 to −1.0 |
| AU17 | 1.0 to 1.5 | −0.5 to −1.0 |
| AU20 | 1.5 to 2.0 | −1.5 to −2.0 |
| AU22 | 1.5 to 2.0 | −1.5 to −2.0 |
| AU23 | 1.5 to 2.0 | −1.0 to −1.5 |
| AU24 | 1.0 to 1.5 | −0.5 to −1.0 |
| AU25 | 0.5 to 1.0 | 0 to −0.5 |
| AU26 | 1.0 to 1.5 | 0 to −0.5 |
| AU27 | 1.5 to 2.0 | −0.5 to −1.0 |

Alternatively, the computer can be programmed to bypass the step of coding FFMs to AUs and/or translating coded AUs to Emotions and Emotional Values and simply code FFMs directly to A&I Values when this correlation is known.

For display purposes, including presentation to clients, it may be the preferred mode to translate each of the FACS emotions into more business-friendly terms. Thus among the negative emotions, disgust becomes dislike; anger becomes frustration; and fear becomes anxiety.

Reporting

A number of reporting options exists for representing the data. Briefly, the Emotional Values and/or A&I Values may be reported for each participant, segmented groups of the participants (e.g., men v. women or those who had purchased the advertised product before v. those who had not purchased the advertised product before) or all participants. The Emotional Values and/or A&I Values may also be reported at selected time intervals (e.g., every second), at selected points in the session (e.g., one report during viewing of the stimulus and another report during the interview), or the entire session. Several exemplary options of specific types of reports include specifically, but not exclusively, (i) reporting the data separately for each individual stimuli, (ii) reporting the data for a plurality of stimuli in comparative form, (iii) reporting the data separately for each member of the sample population, (iv) graphically reporting the average appeal and impact values with each score forming an axis of the graph, (v) graphically reporting the average appeal and impact values for only a selected portion of the exposure period (e.g., the first two seconds of exposure to the business stimuli, the reaction to a specific question, etc.), (vi) graphically reporting the average appeal and impact values for a plurality of distinct portions of the exposure period together on the same graph (e.g., scores during exposure to the business stimuli and scores during questioning), (vii) graphically reporting the appeal and impact values for each participant to ascertain the distribution of the participants, (viii) graphically reporting the percentage of each emotional value, (ix) graphically reporting the percentage of each coded emotion relative to all coded emotions, by percentage or otherwise; (x) graphically reporting the percentage of positive and negative emotions.

Another reporting option is reporting the level of emotional engagement. Essentially, the goal here is to indicate the degree to which the sampled participants had a discernible emotional response to the stimuli for which gaze attention is being recorded, using a FACS based system. Thus, the preferred embodiment is to record the percentage of participants who had at least one emotional response based on at least one discernable AU being detected and recorded per participant, regardless of the overall volume of AU's by the participant. Other methods could include: (a) recording the overall volume of AU's for comparative purposes against other stimuli, or (b) recording the average number of AU's discernable by all participants who had at least AU recorded.

Utility

Combining eye tracking output with a facial coding system, especially when it includes a unique scoring system for determining the extent to which consumers are impacted by a business stimulus and whether such impact was favorable or unfavorable, provides a truer scientific means of gauging awareness and consideration effectiveness. Such a presentation of consumer reaction facilitates the decision making process for companies and agencies seeking to make judgments about how best to enhance the effectiveness of their marketing efforts.

To further enhance the usefulness of the data, the stimuli can be placed within a comparative or even directly competitive context when desired. Use of the method with competing stimuli can be evaluated, providing not only a summary of the eye tracking and facial coding behavioral responses but also a comparison between two stimuli performances, revealing subtle differences. Use of the method enhances the ability of a company to tailor product and marketing efforts to existing and prospective customers.

The method possesses several advantages, including: (1) the ability to capture the subtle, otherwise undetectable ways in which our bodies register and reflect our actions and emotions, (2) the ability to capture subconscious behavioral responses to stimuli beyond what might be otherwise consciously known and verbally acknowledged, (3) the ability to practice real-time and frame-by-frame assessment of responses during the initial experience of a stimulus, (4) the ability to conduct the study in an unobtrusive and non-invasive manner, and (5) an objective based scientific system for monitoring gaze attention and emotional responses which is more accurate and precise than subjective reports.

The method can be usefully and successfully employed in connection with substantially any stimuli, finding excellent commercial application to business stimuli, including specifically, but not exclusively, television advertising, movie trailers, customer service dynamics, signage, uniforms, vehicles, print ads, direct mail, product packaging and design, point of purchase displays, actual packaged or unpackaged products, store environments, corporate lobbies, logos, brand names, taglines, catalogs, entire web sites, individual web pages, Power Point™ presentations, company announcements, etc.

CL EXAMPLES

Example 1

Eye Fixation Raw Data

A participant was exposed to a stimuli depicted on a computer monitor set at a screen resolution of 1024×768. The eye movements were captured using a Tobii Model 1750 Eye Tracker. Minimum duration of fixation was set at 50 milliseconds. The time, duration and location of detected fixations are reported in TABLE SIX below.

TABLE SIX

| FIXATION # | ELAPSED TIME (milliseconds) | DURATION (milliseconds) | PIXEL LOCATION X | PIXEL LOCATION Y |
|---|---|---|---|---|
| 1 | 67 | 100 | 489 | 310 |
| 2 | 286 | 100 | 296 | 360 |
| 3 | 964 | 60 | 490 | 324 |
| 4 | 1343 | 80 | 486 | 328 |
| 5 | 2739 | 60 | 404 | 277 |
| 6 | 2858 | 100 | 402 | 273 |
| 7 | 3117 | 80 | 508 | 447 |
| 8 | 4593 | 100 | 517 | 345 |
| 9 | 5270 | 60 | 484 | 381 |
| 10 | 5390 | 100 | 484 | 377 |
| 11 | 6008 | 120 | 470 | 391 |
| 12 | 6267 | 60 | 500 | 341 |
| 13 | 7065 | 60 | 518 | 385 |
| 14 | 7244 | 80 | 516 | 387 |
| 15 | 7802 | 60 | 428 | 270 |
| 16 | 8121 | 60 | 572 | 394 |
| 17 | 8400 | 100 | 573 | 395 |
| 18 | 8819 | 60 | 436 | 266 |
| 19 | 9019 | 80 | 606 | 352 |
| 20 | 9317 | 80 | 433 | 284 |
| 21 | 9517 | 80 | 435 | 281 |
| 22 | 9716 | 80 | 438 | 287 |
| 23 | 10394 | 100 | 528 | 281 |
| 24 | 10733 | 60 | 524 | 288 |
| 25 | 10853 | 80 | 523 | 290 |
| 26 | 11052 | 80 | 567 | 291 |
| 27 | 11530 | 80 | 548 | 321 |
| 28 | 11630 | 100 | 575 | 325 |
| 29 | 11850 | 80 | 574 | 324 |
| 30 | 12049 | 80 | 553 | 380 |
| 31 | 12687 | 80 | 518 | 349 |
| 32 | 13644 | 120 | 428 | 337 |
| 33 | 14062 | 120 | 332 | 382 |
| 34 | 14421 | 179 | 371 | 365 |
| 35 | 15378 | 60 | 594 | 320 |
| 36 | 15797 | 60 | 483 | 341 |
| 37 | 16176 | 60 | 512 | 345 |
| 38 | 16335 | 80 | 515 | 350 |
| 39 | 16475 | 60 | 509 | 346 |
| 40 | 17771 | 100 | 439 | 288 |
| 41 | 18030 | 80 | 431 | 334 |
| 42 | 19126 | 119 | 680 | 341 |
| 43 | 19964 | 80 | 307 | 207 |
| 44 | 20342 | 60 | 463 | 337 |
| 45 | 20522 | 119 | 529 | 360 |
| 46 | 20921 | 120 | 526 | 362 |
| 47 | 21260 | 80 | 483 | 264 |
| 48 | 21658 | 119 | 470 | 263 |
| 49 | 22316 | 80 | 556 | 381 |
| 50 | 22515 | 159 | 529 | 272 |
| 51 | 24429 | 80 | 524 | 376 |
| 52 | 24669 | 80 | 483 | 259 |
| 53 | 24848 | 80 | 483 | 264 |
| 54 | 25067 | 80 | 432 | 370 |
| 55 | 25386 | 80 | 513 | 307 |
| 56 | 25526 | 60 | 513 | 308 |
| 57 | 25944 | 60 | 520 | 276 |
| 58 | 27001 | 80 | 514 | 314 |
| 59 | 27500 | 80 | 560 | 322 |
| 60 | 28397 | 60 | 519 | 359 |
| 61 | 28596 | 119 | 490 | 344 |
| 62 | 29134 | 82 | 501 | 203 |
| 63 | 29373 | 80 | 494 | 192 |
| 64 | 29872 | 80 | 473 | 299 |
| 65 | 30869 | 80 | 486 | 349 |
| 66 | 31507 | 160 | 481 | 362 |
| 67 | 31726 | 60 | 483 | 359 |
| 68 | 32523 | 60 | 524 | 534 |
| 69 | 33261 | 60 | 520 | 444 |
| 70 | 33740 | 80 | 466 | 575 |
| 71 | 33939 | 60 | 361 | 545 |
| 72 | 34059 | 100 | 358 | 541 |
| 73 | 34497 | 179 | 493 | 326 |
| 74 | 34697 | 60 | 494 | 384 |

Example 2

Eye Fixation Map

Figure 2:
FIG. 2 is an example of the report aspect of the invention.

A participant was exposed to a stimuli depicted on a computer monitor. The eye movements were captured using a Tobii Model 1750 Eye Tracker. Minimum duration of fixation was set at 50 milliseconds. The initial saccade and first detected fixation point are shown in FIG. 2 as a gray line and gray dot respectively, superimposed on the stimuli.

Example 3

Report with Eye Fixation Spots Map and Emotions

Figure 3:
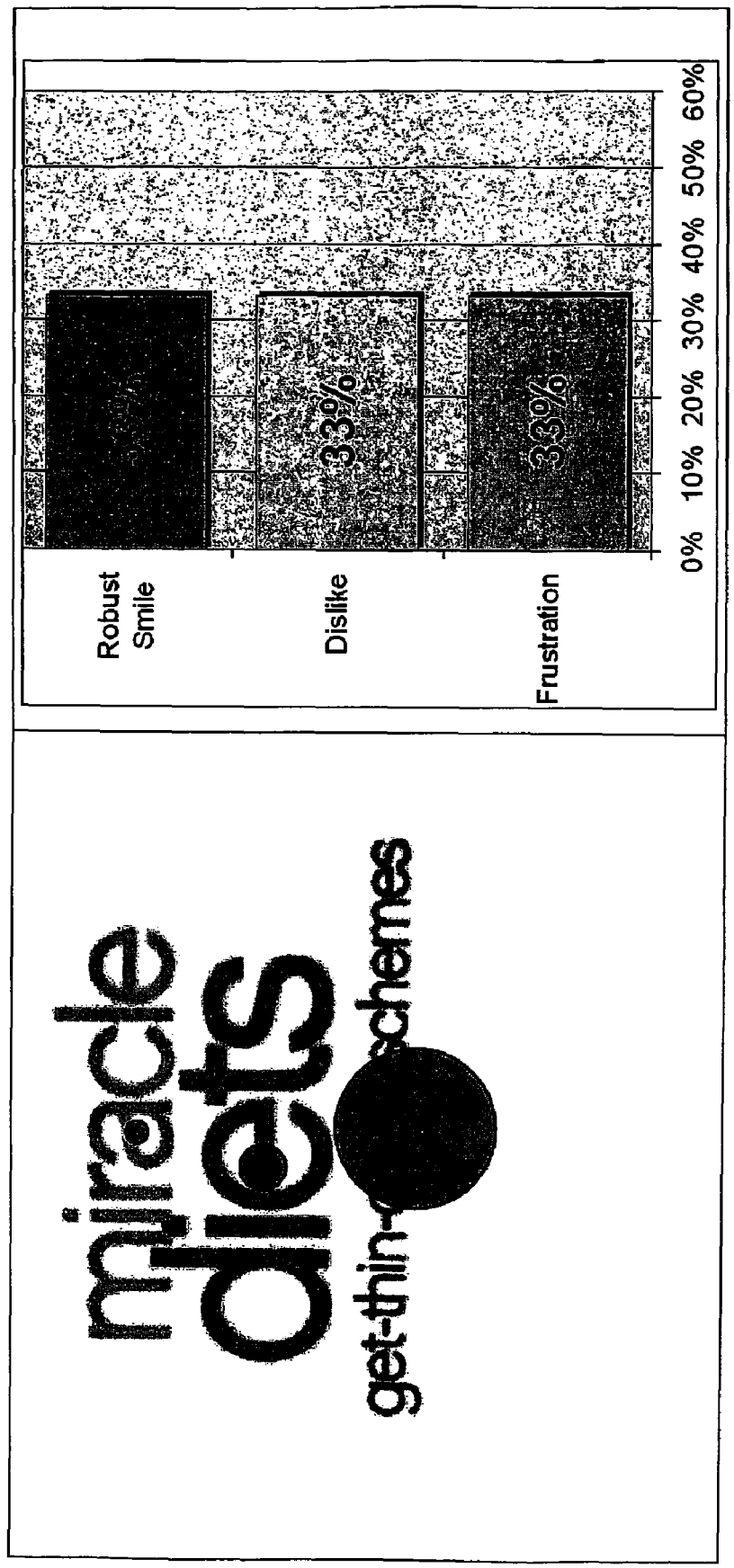
FIG. 3 is an example of the report aspect of the invention.

About thirty five participants were each exposed to a television spot, in each case for a duration of 30 seconds. The eye movements were captured using a Tobii Model 1750 Eye Tracker. The faces of the participants were also videotaped during the 30 second exposure period. The eye tracking output consisted of a dot map for each second of the television spot, with dots showing where the participants directed most of their gaze attention and dot size representing duration of fixation and number of participants. The videotape of each participant was analyzed using FACS. The top three coded emotions, by percentage of activity elicited by the television spot, was displayed alongside each dot map. One of the resultant reports is depicted in FIG. 3.

Example 4

Report with Eye Fixation Gaze-Density Map and Emotions

Figure 4:
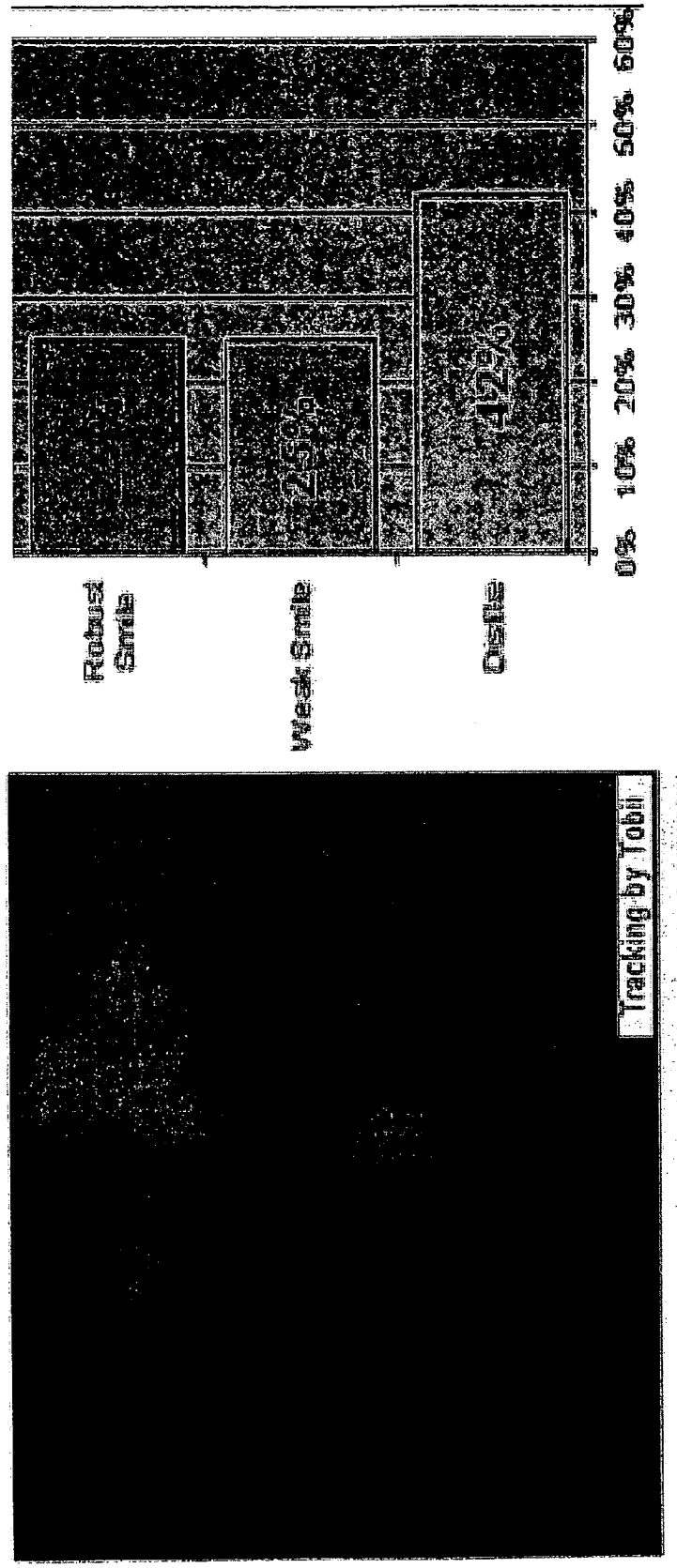
FIG. 4 is an example of the report aspect of the invention.

About thirty five participants were each exposed to a television spot, in each case for a duration of 30 seconds. The eye movements were captured using a Tobii Model 1750 Eye Tracker. The faces of the participants were also videotaped during the 30 second exposure period. The eye tracking output consisted of a hot spot map for each second of the television spot with a variation in color intensity and/or color selection depicting where the participants directed most of their gaze attention. The videotape of each participant was analyzed using FACS. The percentage of positive and negative facial coding activity, as well as the top three coded emotions by percentage of activity elicited by the television spot was displayed alongside the hot spot gaze-density map. The resultant report is depicted in FIG. 4.

Example 5

Report with Eye Fixation Gaze-Density Map, Eye Fixation % Table and Emotions

Figure 5:
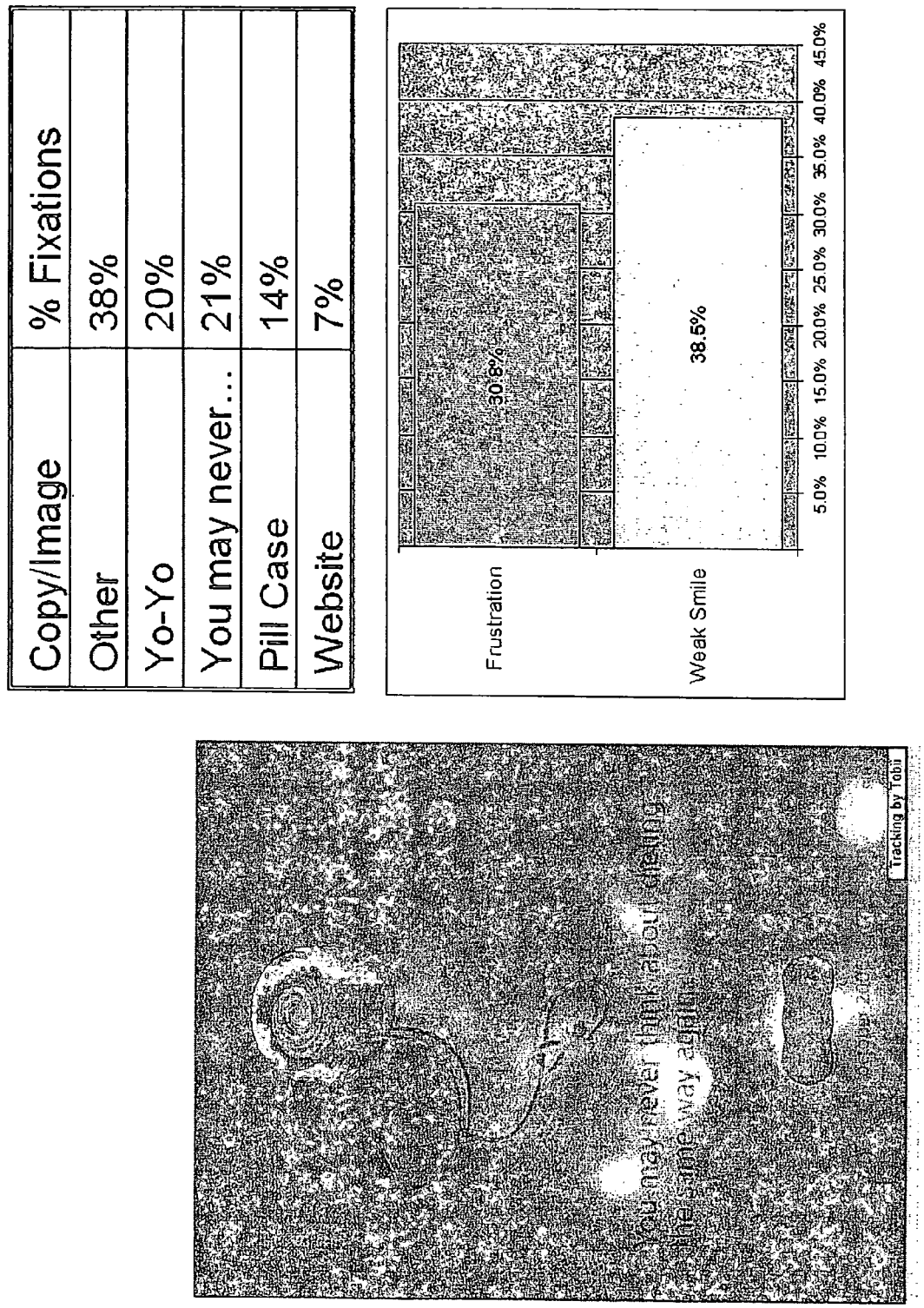
FIG. 5 is an example of the report aspect of the invention.

About thirty five participants were each exposed to a print ad, in each case for a duration of 10 seconds. The eye movements were captured using a Tobii Model 1750 Eye Tracker. The faces of the participants were also videotaped during the 10 second exposure period. The eye tracking output consisted (i) of a single hot spot gaze-density map showing where the participants directed most of their gaze attention, and (ii) a table listing number of eye fixations and/or cumulative eye fixation duration as a % of the total number of eye fixations and/or eye fixation duration, for various areas of interest on the print ad input into the eye tracking system. The videotape of each participant was analyzed using FACS. The top two coded emotions by percentage of activity elicited by the print ad was displayed alongside the hot spot gaze-density map and eye fixation table. The resultant report is depicted in FIG. 5.

Example 6

Report with Eye Fixation Gaze-Density Map and Graph of Impact and Appeal

Figure 6:
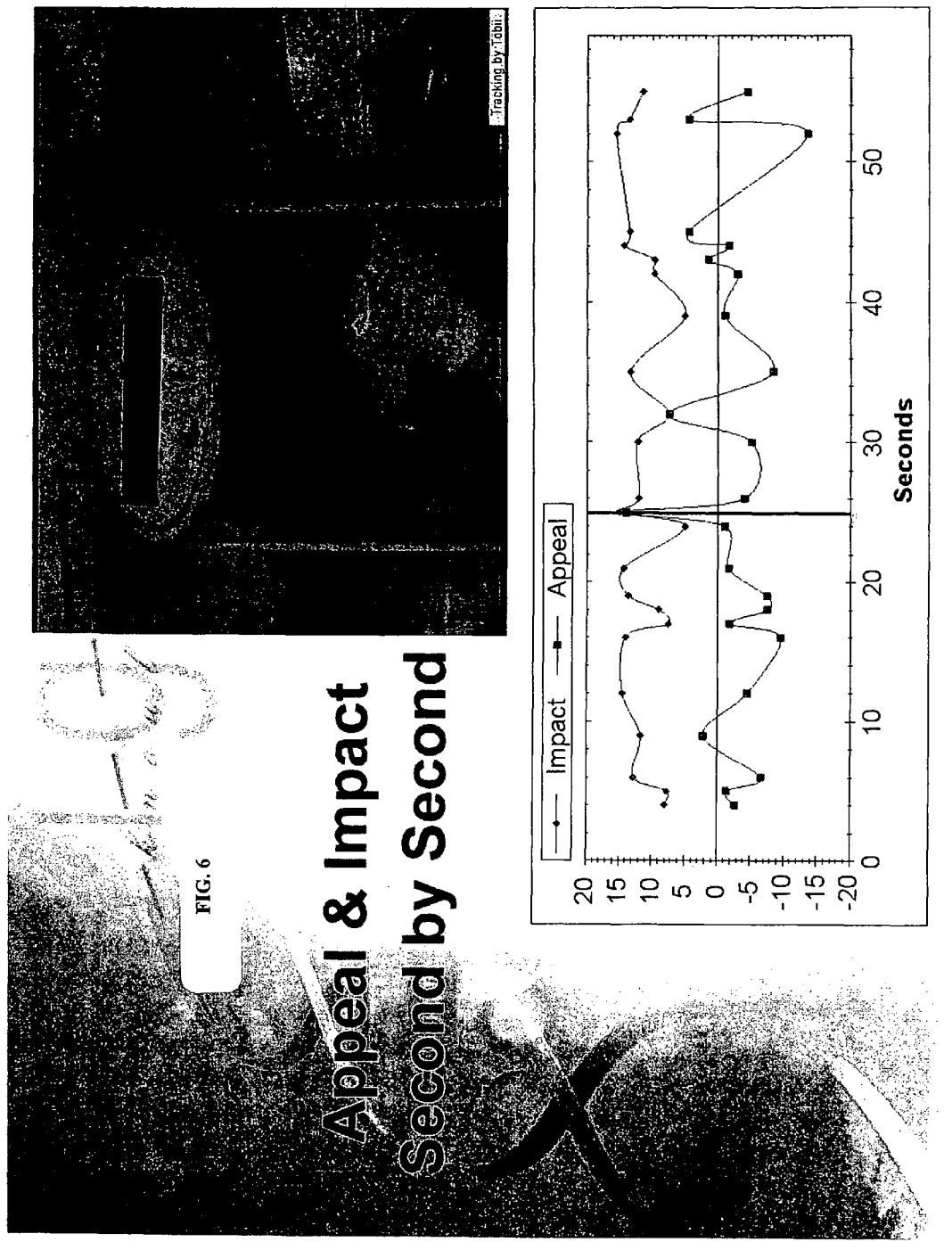
FIG. 6 is an example of the report aspect of the invention.

About fifteen participants were each exposed to a video of the interior design of a store, in each case for a duration of 60 seconds. The eye movements were captured using a Tobii Model 1750 Eye Tracker. The faces of the participants were also videotaped during the 60 second exposure period. The eye tracking output consisted of second-by-second hot spot gaze-density maps of the in-store video, showing where the participants directed most of their gaze attention during that second. The videotape of each participant was analyzed using FACS. The Impact and Appeal scores elicited by the in-store video during the exposure period was determined and displayed on a chronological graph. The report consists of a second-by-second display of the hot spot gaze-density maps, along with a sliding line on the Impact and Appeal graph indicating the time at which the currently displayed hot spot gaze-density map occurred. The report at one point in time is depicted in FIG. 6.

Example 7

Figure 7:
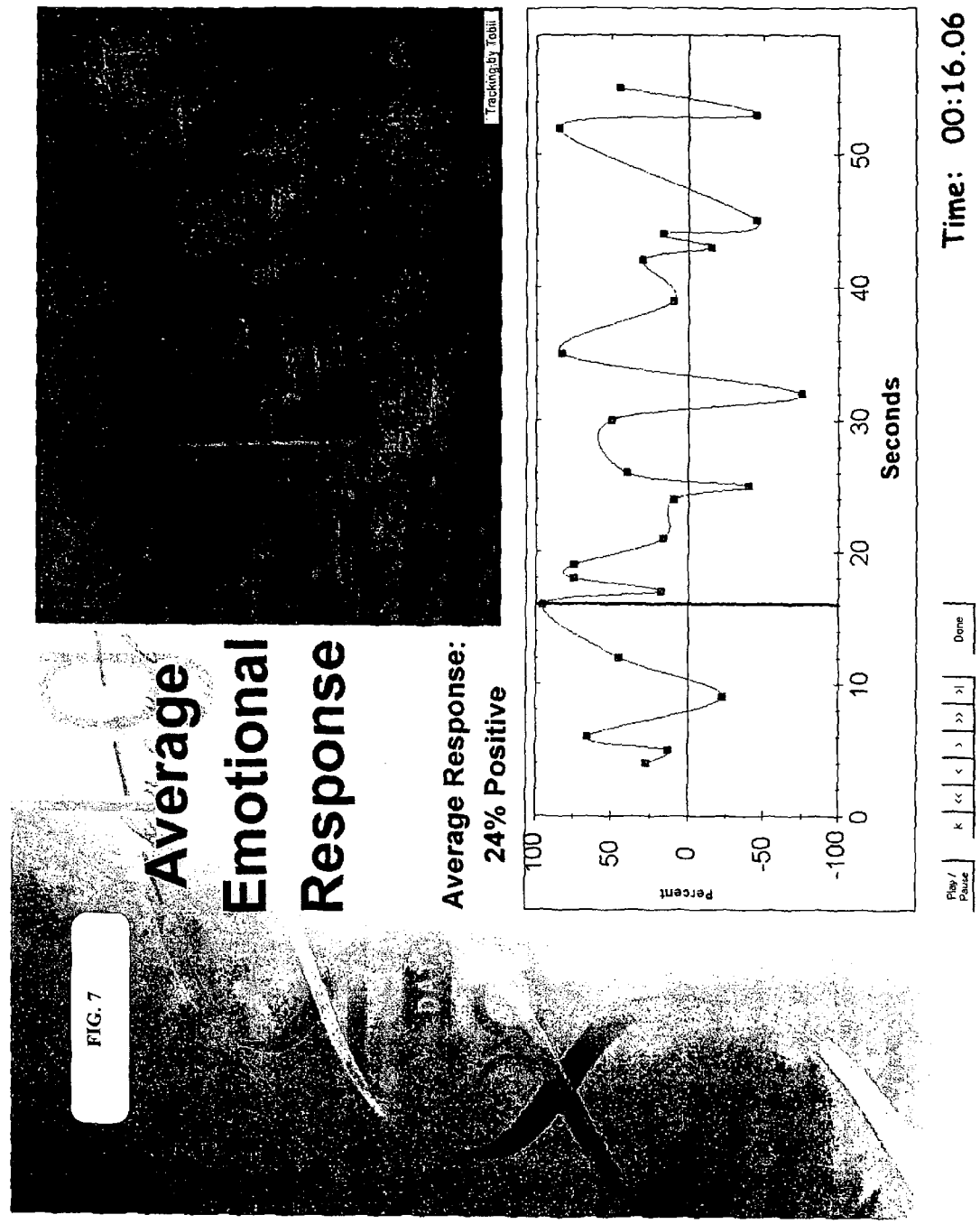
FIG. 7 is an example of the report aspect of the invention.

Report with Eye Fixation Gaze-Density Map and Graph of Average Emotional Response About fifteen participants are each exposed to a video of the interior design of a store, in each case for a duration of 60 seconds. The eye movements are captured using a Tobii Model 1750 Eye Tracker. The faces of the participants are also videotaped during the 60 second exposure period. The eye tracking output consists of second-by-second hot spot gaze-density maps of the in-store video, showing where the participants directed most of their gaze attention during that second. The videotape of each participant is analyzed using FACS. The sum of positive and negative facial coding activity elicited by the in-store video during each second of the exposure period is determined and displayed on a chronological graph. The report consists of a second-by-second display of the hot spot gaze-density maps, along with a sliding line on the positive and negative emotional graph indicating the time at which the currently displayed hot spot gaze-density map occurs. The report at one point in time is depicted in FIG. 7.

Example 8

Report of Average Emotional Response

Figure 8:
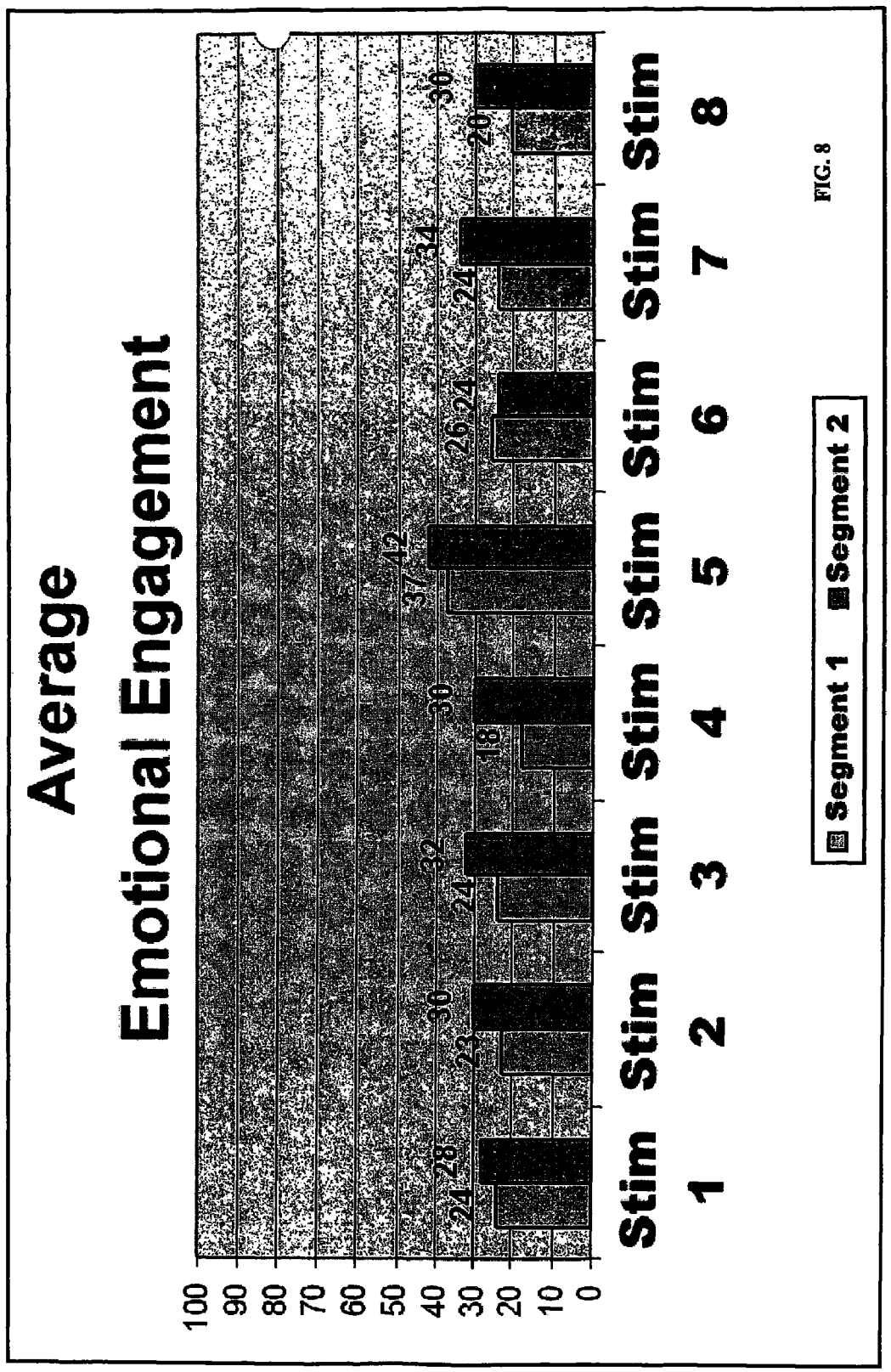
FIG. 8 is an example of the report aspect of the invention.

About two hundred and forty participants grouped into Segment 1 and Segment 2 based upon personality type, were each exposed to eight different stimuli of various types for various durations ranging from a duration of about 10 seconds for a print ad to about 120 seconds for a booklet. The eye movements of thirty five of the participants were captured when viewing stimuli 1-3 and 5-7 using a Tobii Model 1750 Eye Tracker. The faces of all two hundred and forty participants were also videotaped during the exposure periods. The eye tracking output consisted of hot spot gaze-density maps for stimuli 1-3 and 5-7 showing where the thirty five participants directed most of their gaze attention. The videotape of all two hundred and forty participants was analyzed using FACS. The percentage of participants in each segment who demonstrated an emotional engagement with the stimuli is represented as a bar graph on the report depicted in FIG. 8.

I claim:
1. A method of reporting consumer reaction to a stimulus, comprising:
   (a) receiving a visual recording stored on a computer-readable storage medium of facial expressions and a recording of eye positions of a human subject during a time period of exposure to a business stimulus, the recording having a chronological sequence of recorded facial expressions and a chronological sequence of eye positions of the human subject;
   (b) generating, from the recording of eye positions, at least one gaze fixation, each of the at least one gaze fixations relating to an eye position of the subject, a corresponding visual portion of the stimulus, and a corresponding fixation time during the time period;
   (c) using a processor executing computer-executable program code to access the computer-readable storage medium and code recorded facial expressions stored thereon to at least one emotion for each fixation time; and
   (d) associating an emotion with at least one of the particular gaze fixation and the visual portion of the stimulus corresponding to the particular gaze fixation based on the at least one emotion associated with the fixation time for the particular gaze fixation.
2. The method of claim 1 further comprising (i) repeating steps (a) through (d) for a plurality of human subjects with the same stimulus, and (ii) reporting information indicating the percentage of human subjects who exhibited at least one recorded facial expression capable of being coded.
3. The method of claim 1 wherein steps (a) through (d) are repeated for a plurality of consecutive time periods.
4. The method of claim 1 wherein each of the at least one gaze fixations relates to an eye position of the subject remaining fixed on a location for at least 50 milliseconds.
5. The method of claim 4 further comprising reporting recorded eye positions comprising superimposing a visual indication of the location of the recorded eye positions upon a depiction of the stimulus.
6. The method of claim 4 further comprising reporting recorded eye positions comprising superimposing a visual indication of the density of recorded eye positions upon a depiction of the stimulus.
7. The method of claim 1 wherein the time period of exposure to the stimulus lasts for 1 to 10 seconds.
8. The method of claim 1 wherein coding recorded facial expressions is based at least in part upon FACS the Facial Action Coding System.
9. The method of claim 1 further comprising reporting:
   (a) a visual indication of the eye positions of the human subject while exposed to the stimulus during the time period;
   (b) a list of the at least one emotion coded from the facial expressions exhibited by the subject while exposed to the stimulus; and
   (c) an identification of the stimulus to which the subject was exposed.
10. The method of claim 9 wherein the visual indication of the eye positions comprises superimposing the location of the eye positions upon a depiction of the stimulus.
11. The method of claim 9 wherein the visual indication of the eye positions comprises a density of eye positions throughout the time period superimposed upon a depiction of the stimulus.

12. The method of claim 1 further comprising reporting at least one emotion and at least one associated visual portion of the stimulus.

13. The method of claim 12 wherein reporting the at least one emotion comprises reporting a tally of coded emotions as a percentage of each coded emotion relative to all coded emotions.

14. The method of claim 12 wherein (i) coding recorded facial expressions to at least one emotion in act (c) comprises coding recorded facial expressions to positive and negative emotions, and (ii) reporting the at least one emotion comprises reporting at least one of (−) the percentage of all coded emotions comprising positive emotions, (−) the percentage of all coded emotions comprising negative emotions, and (−) an average of positive and negative coded emotions.

15. The method of claim 1, wherein coding recorded facial expressions in act (c) comprises coding recorded facial expressions to at least one action unit for each fixation time, wherein at least one of the at least one action units for each fixation time is translated to a plurality of weighted emotions.

16. The method of claim 15 further comprising reporting a plurality of weighted emotions and at least one associated visual portion of the stimulus.

17. The method of claim 1, wherein coding recorded facial expressions in act (c) comprises coding recorded facial expressions to at least a first plurality of weighted emotions for each fixation time.

18. The method of claim 17 further comprising reporting a plurality of emotions and at least one associated visual portion of the stimulus.

* * * * *